(No Model.)

J. S. BERRY.
SURFACE CATTLE GUARD.

No. 483,039. Patented Sept. 20, 1892.

Witnesses
Jesse Heller
Phill O. Masi

Inventor
John S. Berry,
by E. W. Anderson
his Attorney

UNITED STATES PATENT OFFICE.

JOHN S. BERRY, OF TYLER, TEXAS.

SURFACE CATTLE-GUARD.

SPECIFICATION forming part of Letters Patent No. 483,039, dated September 20, 1892.

Application filed December 28, 1891. Serial No. 416,325. (No model.)

*To all whom it may concern:*

Be it known that I, JOHN S. BERRY, a citizen of the United States, and a resident of Tyler, in the county of Smith and State of Texas, have invented certain new and useful Improvements in Surface Cattle-Guards; and I do declare the following to be a full, clear, and exact description of the invention, such as will enable others skilled in the art to which it appertains to make and use the same, reference being had to the accompanying drawings, and to letters of reference marked thereon, which form a part of this specification.

Figure 1:
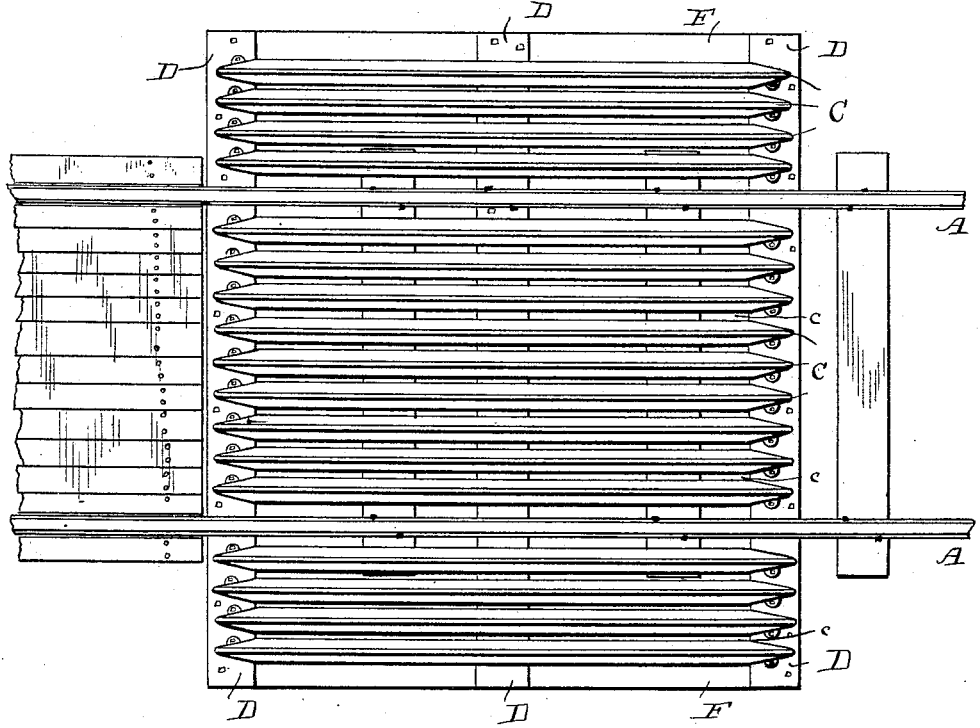
Figure 2:
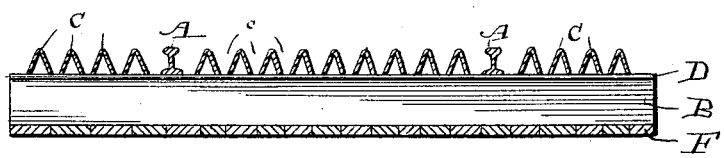

Figure 1 of the drawings is a representation of the invention in top plan, and Fig. 2 is a cross-section.

This invention has relation to certain new and useful improvements in cattle-guards for railway-tracks; and it consists in the novel construction and combination of parts, as hereinafter described, and pointed out in the claim.

In the accompanying drawings the letters A A designate the track-rails supported upon and secured to the cross-ties B.

C C, &c., designate a series of bars triangular or V-shaped in cross-section, bolted or otherwise suitably secured at their ends to flat plates or bars D, resting on the cross-ties at each end and at the center of the guard. Said bars C C, &c., are arranged between and at the sides of the rails A A and are parallel therewith, their edges or angles being presented upwardly, and separated from each other by intervals c c, &c.

The cross-ties B rest on a solid plank floor F, which obviates the necessity of a deep pit and prevents the guard from settling. It also prevents the growth of grass and weeds, the presence of which presents an attraction to animals, and which when dry are liable to catch fire. Said floor also serves to prevent the soil from working up through between the cross-ties and filling the spaces or intervals between the guard bars or slats. The plates or bars D are usually securely spiked to the cross-ties.

The arrangement of the triangular bars or slats, as above described, forms a guard which will effectually stop animals from passing thereover.

Having described this invention, what I claim as new, and desire to secure by Letters Patent, is—

A cattle-guard comprising a series of parallel triangular bars tapered at their ends and provided with lateral perforated horizontal flanges, the plates D D, to which said flanges are secured, the cross-tie supports, and the solid plank flooring upon which said ties rest, said flooring being some distance below the guard-bars, substantially as specified.

In testimony whereof I affix my signature in presence of two witnesses.

JOHN S. BERRY.

Witnesses:
H. E. FLACK,
G. E. GRIMES.